Sept. 30, 1941. H. W. BAILEY 2,257,586
AUTOMATIC APERTURE CONTROL MECHANISM FOR CAMERA DIAPHRAGMS
Filed Sept. 7, 1939 3 Sheets-Sheet 1

Inventor:
Harrison W. Bailey,
by Franklin E. Low
Att'y.

Sept. 30, 1941.   H. W. BAILEY   2,257,586
AUTOMATIC APERTURE CONTROL MECHANISM FOR CAMERA DIAPHRAGMS
Filed Sept. 7, 1939   3 Sheets-Sheet 2

Inventor:
Harrison W. Bailey.
by Franklin E. Low.
Att'y

Sept. 30, 1941.   H. W. BAILEY   2,257,586
AUTOMATIC APERTURE CONTROL MECHANISM FOR CAMERA DIAPHRAGMS
Filed Sept. 7, 1939   3 Sheets-Sheet 3
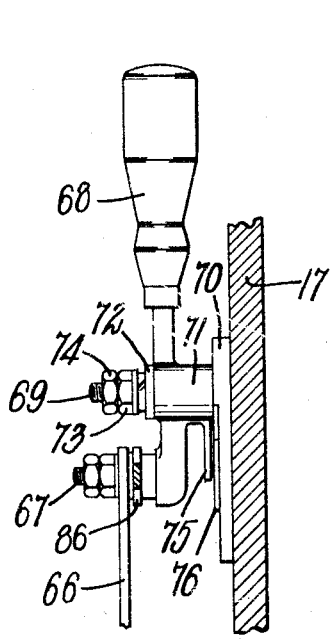
Fig. 4.
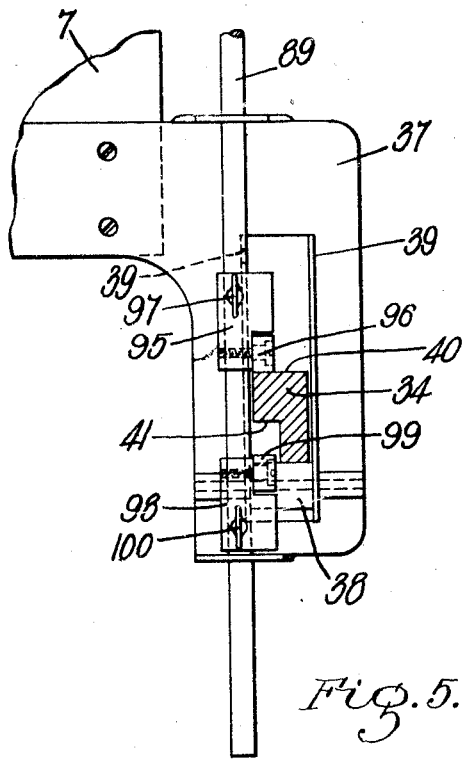
Fig. 5.
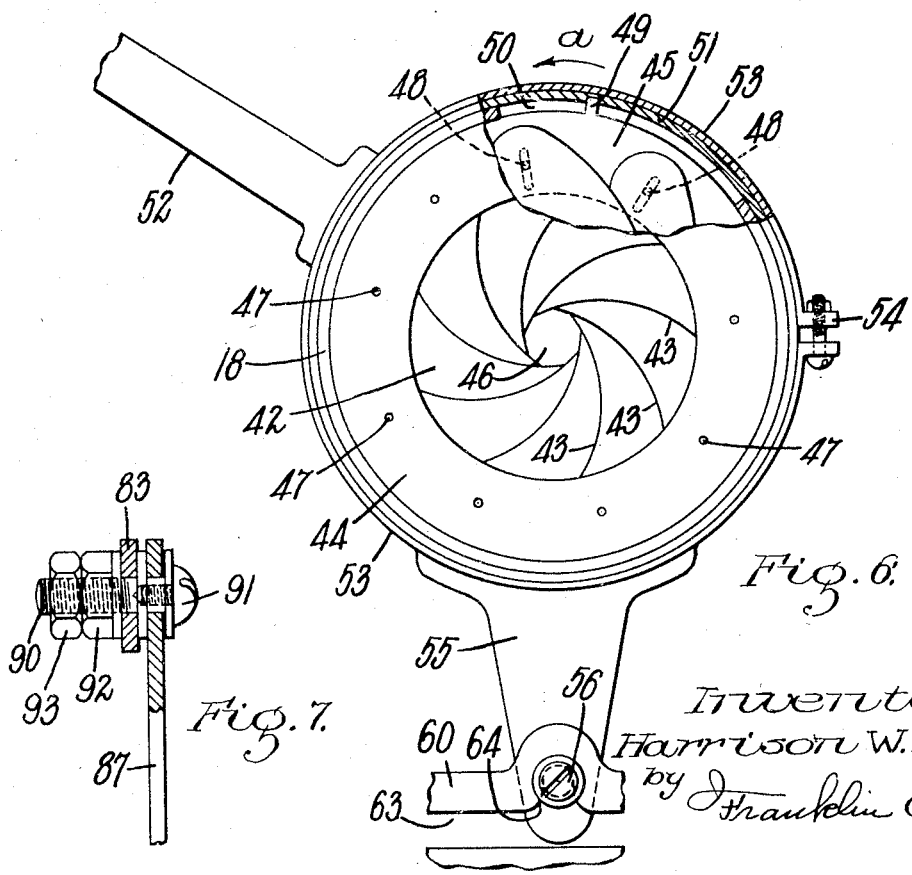
Fig. 6.
Fig. 7.
Inventor:
Harrison W. Bailey
by Franklin E. Low
Att'y.

Patented Sept. 30, 1941

2,257,586

UNITED STATES PATENT OFFICE 2,257,586

AUTOMATIC APERTURE CONTROL MECHANISM FOR CAMERA DIAPHRAGMS

Harrison W. Bailey, South Braintree, Mass.

Application September 7, 1939, Serial No. 293,670

8 Claims. (Cl. 95—64)

This invention relates broadly to cameras of the type employed in the photo-engraving, photo-lithographing and off-set printing arts, and particularly to an automatic aperture control mechanism for the iris diaphragms provided for the lenses of such cameras.

In the photo-engraving, photo-lithographing and off-set printing arts it is very important in half-tone work that a perfect screen negative shall be produced from the continuous tone original copy photographed, if first class reproductions are to be provided. Heretofore the making of the negative in this type of photography has been a matter of considerable speculation and guesswork on the part of the photographer. After the subject matter to be photographed has been focused through an aperture of predetermined size provided in an iris diaphragm associated with the camera lens it has been necessary for the photographer to study the highlights and middletones of his subject and determine as to the size of the apertures which should be utilized for the highlight and middletone exposures. It has long since been established that for highlight exposures the diameter of the diaphragm aperture should always be proportionate to the bellows extension, which is the distance between the lens of the camera and the sensitized plate or film upon which the negative is produced, and numerous devices have been provided having charts, scales, figures and other indicia embodied therein intended to aid the photographer in calculating the correct diameters for the diaphragm apertures to be utilized, but invariably these devices have been so intricate and the calculations so complicated that even skilled operators find them difficult to understand and manipulate. None of these devices are attached to the lens diaphragm or to its operating mechanism and are operated in any manner thereby. It is, therefore, often necessary for the photographer to make several negatives before a satisfactory one is produced.

The primary object of this invention is to provide a simple, effective apparatus whereby the size of the diaphragm apertures for the highlight and middletone exposures may be established automatically when the camera is focused, thereby making it possible for the operator to set the diaphragm instantly for both of said exposures without any guesswork or preliminary calculations.

Another object of the invention is to provide a means whereby the apparatus may be set instantly in order that "low" or "high" negatives may be produced as required for photo-engraving and off-set printing work respectively.

Another object of the invention is to provide a structure which will permit an iris diaphragm for a camera lens to be controlled automatically from all positions of said lens.

Still another object of the invention is to provide a control structure of the character mentioned wherein the diaphragm operating lever may be released instantly at all times in order that the diaphragm may be set for an aperture of predetermined size for "flashing" purposes.

The invention consists of an aperture control mechanism for camera diaphragms as set forth in the following specification and particularly as pointed out in the claims.

Referring to the drawings:

Fig. 4 is an enlarged side elevation of the structure utilized for setting the apparatus for taking "high" and "low" negatives.

Fig. 5 is an enlarged front elevation of that portion of the control mechanism that is located adjacent to the control cam and that engages the surfaces thereof, with the various members positioned for making highlight exposures.

Fig. 6 is an enlarged sectional elevation illustrating the iris diaphragm and portions of the operating mechanism therefor.

Fig. 7 is an enlarged detail section taken on the line 7—7 of Fig. 2.

Like numerals refer to like parts throughout the several views of the drawings.

Figure 1:
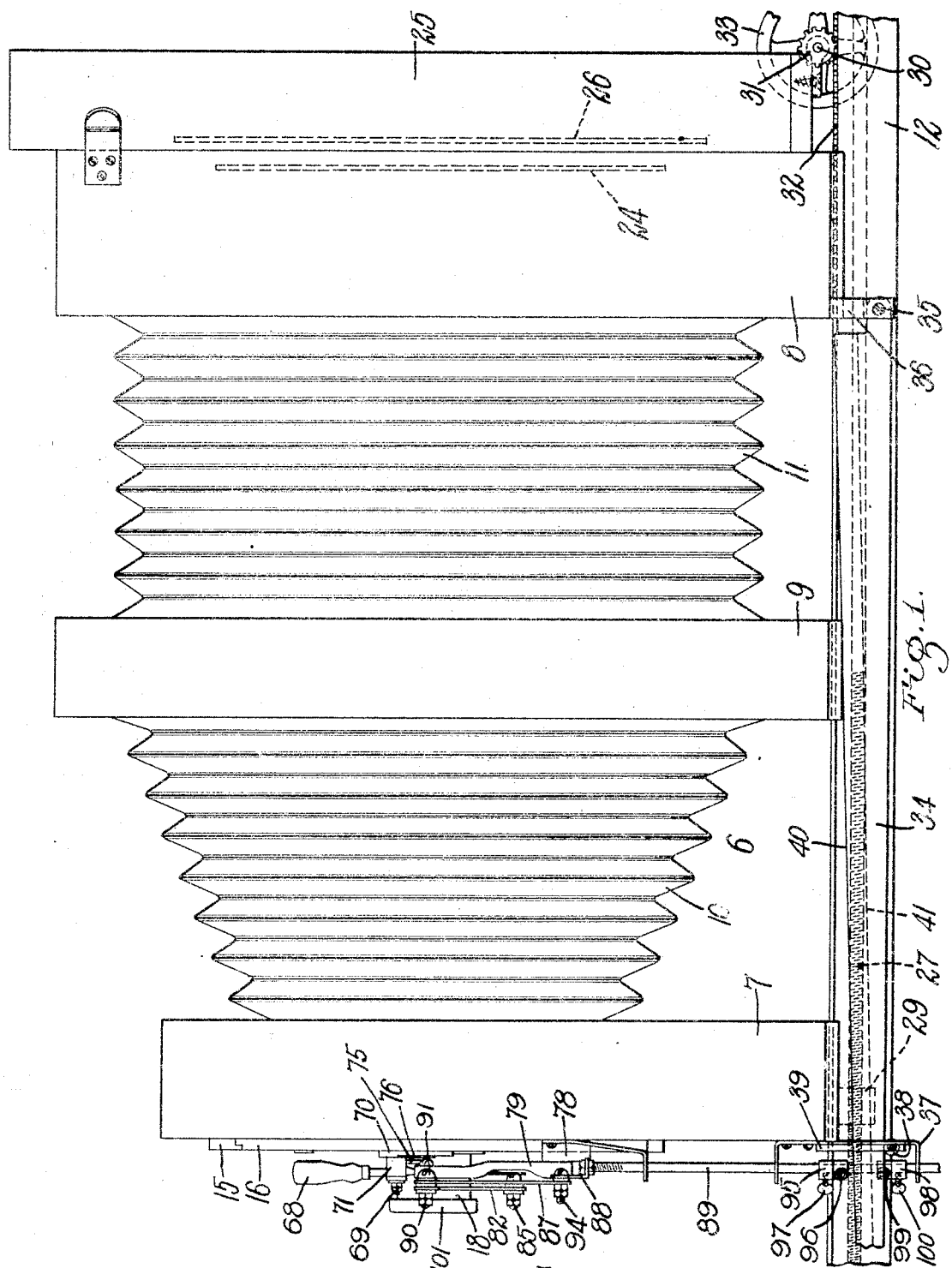
Fig. 1 is a side elevation of a camera having the mechanism of this invention applied thereto.

In the drawings, 6 represents a camera of conventional type and well known in the photo-engraving, photo-lithographing and off-set printing arts, said camera embodying therein front and rear box members 7 and 8 respectively, an intermediate box member 9, and front and rear bellows portions 10 and 11 respectively, all connected one to another in a well known manner. The box members 7, 8 and 9 are mounted upon horizontal guide members 12 which are supported in a well known manner upon a suitable base or frame well known in the art. Mounted in suitable guideways 13 provided upon the front box member 7 is a main slide 14 provided with guideways 15 in which a secondary slide 16 is also slidably mounted. The slide 16 has a centrally disposed lens board 17 detachably mounted thereon to which a casing 18 containing a group of lenses of any suitable type and arrangement is secured in a well known manner. The slides 14 and 16 are moved vertically in unison in the guideways 13 and held in adjusted position by means of a screw 19 which engages a screw threaded member 20 provided upon the slide 16. The slide 16 is moved horizontally in the guideways 15 by means of a shaft 21 having a gear 22 slidably mounted thereon and rotatable therewith, said gear meshing with a rack 23 fast to said slide. The adjusting mechanisms for the slides 14 and 16 are well known in the art, and the screw 19 and shaft 21 are operated in a well known manner from advantageous positions upon the frame structure of the apparatus.

The rear box member 8 is adapted to have a screen 24 of any suitable type mounted therein, and a holder 25 for a sensitized plate or film 26 is detachably secured at the rear of said box member in a well known manner. The front box member 7 is moved forwardly and rearwardly upon the guide members 12 and relatively to the box member 8 for focusing purposes by means of a screw 27 and handle 28 therefor, said screw engaging a lug 29 provided at the bottom of said box member 7. The rear box member 8 is moved forwardly and rearwardly upon the guide members 12 and relatively to the front box member 7 for focusing purposes by means of a shaft 30 having gears 31 fast thereto which mesh with racks 32 which are secured to the guide members 12, said shaft 30 being rotated by means of a hand wheel 33. The adjusting means for the front and rear box members 7 and 8 respectively are well known in the art, and it will be distinctly understood that any other well known adjusting mechanisms may be utilized for said box members without departing from the spirit of this invention.

Referring now to Figs. 1, 2, 3 and 5, positioned at one side of the camera 6 at a point adjacent to a lower corner of the box members 7 and 8 is an elongated control cam 34 which is pivotally attached at its rear end at 35 to a bracket 36 which in turn is rigidly secured to the box member 8. The cam 34 extends forwardly from the box member 8 in parallel relation to the guide members 12 and projects through a combined support and guide member 37 which is rigidly secured to the front box member 7. At the guide member 37 the cam 34 rests upon a roller 38, and opposite side faces thereof are positioned between vertical flanges 39 provided upon said guide member. The cam 34 is of sufficient length to extend a substantial distance beyond the front face of the guide member 37 when all of the box members are in their extreme extended positions. The cam 34 has an upper or highlight cam surface 40, and a lower or middletone cam surface 41 provided thereon, both of which extend lengthwise of said cam one above the other, and said cam surfaces taper lengthwise toward each other and slope toward the front end of the cam. The cam 34 is provided for the purpose of automatically controlling the movement of an iris diaphragm provided for the lens casing 18. The inclinations of the cam surfaces 40 and 41 have been determined after considerable study and experimentation and the action and functions of these cam surfaces will be hereinafter more fully described.

Mounted in the lens casing 18 is an iris diaphragm 42 of well known type, see Fig. 6, said diaphragm being formed of a plurality of thin flat arcuate members 43 which are assembled in overlapped relation one to another between flat annular members 44 and 45 in a manner to form a variable aperture 46 for said diaphragm. The diaphragm members 43 are all pivotally attached to one end thereof at 47 to the annular member 44 and slidably connected at their opposite ends at 48 to the annular member 45. The member 45 has a lip 49 projecting radially from its periphery through a slot 50 provided in the lens casing 18, and said lip interlocks with an operating ring 51 which is loosely mounted upon the lens casing 18. A rotary movement imparted to the ring 51 in the direction of the arrow a, Fig. 6, will rotate the annular member 45 in a direction to rock the members 43 on their respective pivots 47 and thereby cause the aperture 46 to be reduced in diameter, while a movement of said ring in a reverse direction will cause said aperture to be enlarged. The ring 51 is actuated manually by means of an operating lever 52 having a hub portion 53 embodied therein which encircles said ring and is clamped thereto at 54. The operating lever 52 has an arm 55 embodied therein which projects radially from the hub portion thereof and carries a locking pin 56 which projects forwardly therefrom. A pin 58 projects from the front face of the lens board 17 into the path of the operating lever 52 and constitutes a stop to position the diaphragm for an aperture which has been found to be most satisfactory for focusing purposes.

Figure 2:
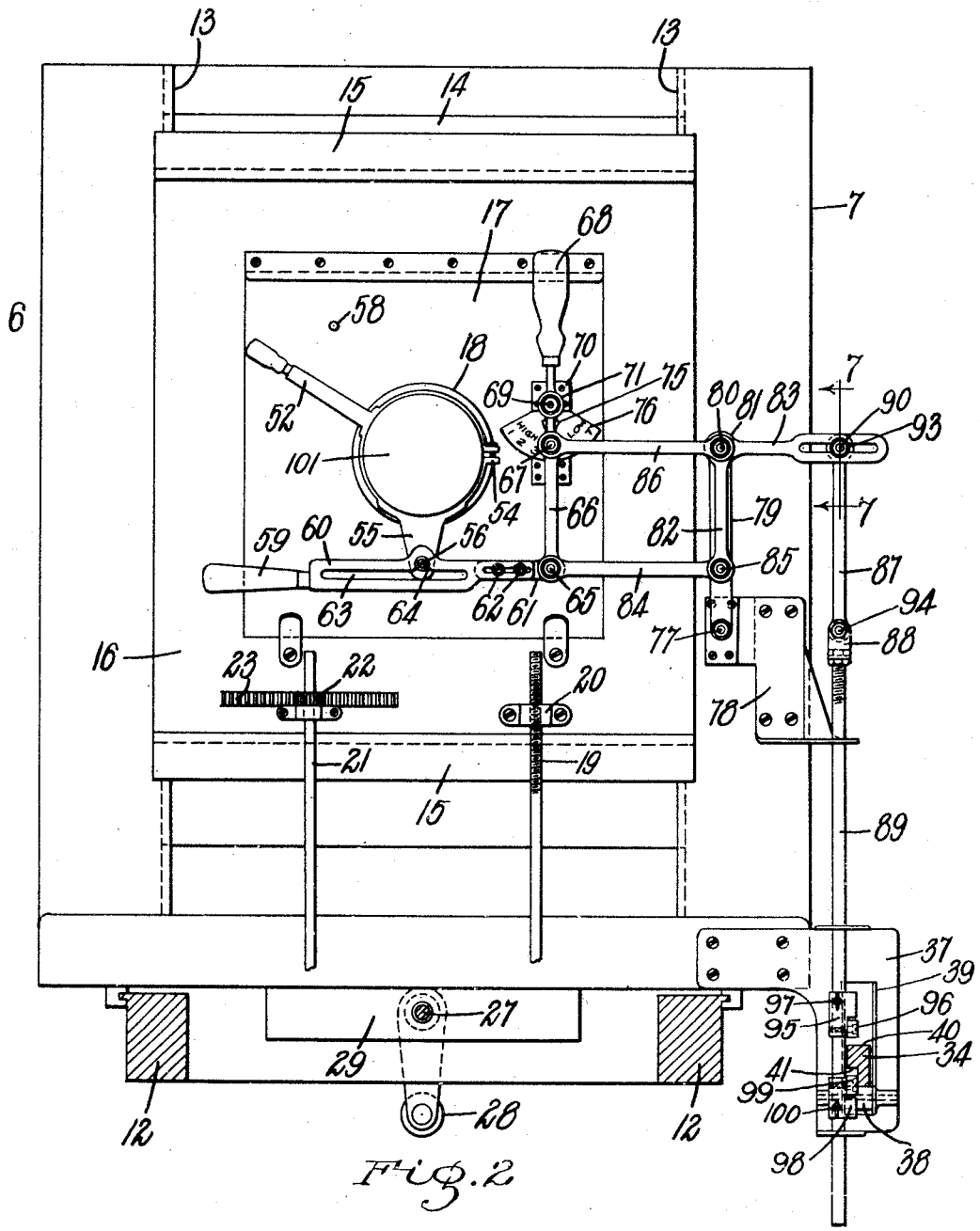
Fig. 2 is a front elevation of the camera including the mechanism of this invention.
Figure 3:
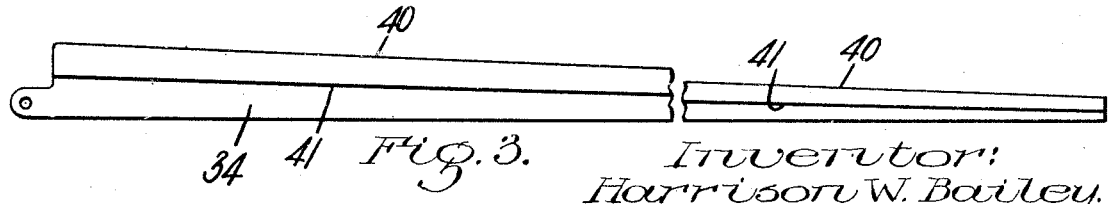
Fig. 3 is a side elevation of the reverse side of the control cam from that illustrated in Fig. 1, an intermediate portion of said cam being broken away to save space in the drawings.

Under certain conditions and for certain purposes hereinafter to be described the operating lever 52 may be moved without restriction to operate the diaphragm 42. Under other conditions and for other purposes, however, the movements of the operating lever are controlled positively by means of the control cam 34 hereinbefore mentioned as follows: Mounted loosely upon the locking pin 56 is a locking lever 59 formed of two members 60 and 61 secured together at 62 to permit a longitudinal adjustment. The member 60 is slotted at 63, and the upper edge of said slot is notched at 64, see Fig. 6, to receive the locking pin 56. The locking lever 59 is pivotally attached at 65 to a link 66, in turn loosely attached at 67 to the lower portion of an adjusting lever 68 which is pivotally attached at 69 to a plate 70 in turn attached to the lens board 17. A hub portion 71 of the lever 68 is frictionally held between the front face of the plate 70 and a friction washer 72 by means of a nut 73 and check nut 74. An indicator 75 projects downwardly from the hub 71 in front of a dial 76 which is fastened to the plate 70, said dial having the words High and Low indicated thereon together with other suitable indicia as may be desired. The normal position of the lever 68 and its indicator 75 are as illustrated in Fig. 2, at which time the indicator is located at an intermediate position between the extreme High and Low positions. The lever 68 is utilized to restrict the movements of the control means for the diaphragm operating lever 52 in a manner to be hereinafter more fully described.

Pivotally attached at 77 to a bracket 78 fast to the front face of the front box member 7 is a rocker arm 79 which normally extends vertically upward from the pivot 77. Pivotally attached at 80 to the upper extremity of the rocker arm 79 is a bell-crank lever 81 having arms 82 and 83 embodied therein. A link 84 loosely connects the lower extremity of the link 66 and pivotal point 65 of the locking lever 59 with the lower extremity of the arm 82 at 85. A link 86 loosely connects the upper extremity of the link 66 with the pivotal point 80 of the bell-crank lever 81. The links 66, 84 and 86, and the arm 82 of the bell-crank lever 81 are constructed and arranged to produce a parallel movement upon their respective pivots when they are actuated either by the movement of the diaphragm operating lever 52 or the lever 68. The arm 83 of the bell-crank lever 81 is slotted and connected by means of a link 87 to a member 88 which in turn is connected to the upper extremity of a rod 89 mounted to slide vertically in the bracket 78 and in bearings provided therefor in the guide member 37. The link 87 is the same length as the rocker arm 79, and said link is loosely attached to a stud 90 by means of a screw 91, and the stud 90 is clamped to the slotted arm 83 of the bell-crank lever 81 by means of a nut 92 and check nut 93, see Fig. 7. The lower extremity of the link 87 is loosely connected to the member 88 at 94. The lower portion of the rod 89 is positioned adjacent to the rear face of the control cam 34 by means of the guide member 37. Mounted upon the rod 89 above the cam 34 is a block 95 carrying a roller 96 which is positioned to contact with the cam surface 40 when the operating lever 52 for the diaphragm 42 is moved to set said diaphragm for the making of highlight exposures. The block 95 is adjustably secured to the rod 89 by means of a screw 97. Mounted upon the rod 89 beneath the middletone cam surface 41 of the cam 34 is a block 98 carrying a roller 99 positioned to contact with said surface 41 when the operating lever 52 is moved to set the diaphragm for the making of middletone exposures. The block 98 is adjustably secured to the rod 89 by means of a screw 100.

The lens casing 18 is provided with a cover 101 well known in the art and operated manually when exposures are made.

The general operation of the mechanism hereinbefore specifically described is as follows: Assuming that the various parts of the mechanism for controlling the operation of the diaphragm 42 are positioned as illustrated in Fig. 2, which is a normal position for average halftone work, and that the cover 101 for the lens casing 18 has been removed therefrom, the free end of the locking lever 59 is raised in order that the locking pin 56 may be released from the notch 64 provided in said lever 59. The lever 52 is then raised until it contacts with the stop pin 58 causing the operating ring 51 for the iris diaphragm 42 to be rotated in a clockwise direction to enlarge the aperture 46 thereof to a predetermined size known to be the best suited for focusing purposes. The original subject matter to be photographed is then focused in a well known manner by moving the front and rear box members 7 and 8 respectively relatively to each other as may be required by their respective adjusting mechanisms. During the focusing action of the camera the lower surface of the cam 34 travels over the roller 38 remaining at all times in a horizontal position, but the positions of the cam surfaces 40 and 41 are continually changing relatively to the highlight and middletone rollers 96 and 99 respectively which may or may not be forced upwardly or downwardly during the movement of the cam depending upon circumstances. At the end of the focusing operation the cover 101 is reapplied to the lens casing 18, the screen 24 is adjusted to position, and the holder 25 for the sensitized plate or film 26 is placed in position in a well known manner.

To prepare the mechanism for a middletone exposure after focusing, the operating lever 52 is moved downwardly from its position against the pin 58 thereby causing the locking pin 56 to move toward the right, Fig. 2, in the slot 63 until said pin aligns with the notch 64, whereupon the locking lever 59 will drop and cause the locking pin to enter said notch thereby permitting the lever 59 to occupy the position illustrated in Fig. 2. A continued downward movement of the operating lever 52 will now cause the locking lever 59 and link 84 to be moved toward the right rocking the bell-crank lever 81 upon its pivot 80 and causing the link 87 and rod 89 to be raised until the middletone roller 99 contacts with the middletone cam surface 41 where sufficient resistance is met to cause the operating lever 52 to be brought to a positive stop. The diaphragm 42 is now correctly set for the making of the middletone exposure which is accomplished by removing the cover 101 from the lens casing 18 and admitting light for a predetermined period after which said cover is reapplied to the lens casing.

To make the highlight exposure following the middletone exposure the operating lever 52 is raised until the highlight roller 96 contacts with the highlight cam surface 40 where sufficient resistance is met to cause said lever to be brought to a positive stop at which time the diaphragm 42 is correctly set for the making of the highlight exposure which is accomplished by again removing the cover 101 and admitting light for a predetermined period after which said cover is again applied to the lens casing.

The photographer may make the highlight exposure prior to the middletone exposure if he so desires, and it will be evident that the diaphragm aperture for each exposure is set without it being necessary for the photographer to resort to guesswork or to rely upon intricate calculating devices.

When focusing the camera if it is necessary to move the lens casing 18 horizontally, which necessitates moving the slide 16 correspondingly, such movement of said slide and the resulting movement of the lens casing will cause the rocker arm 79 and the link 87 to rock upon their respective pivots 77 and 94 without causing any rocking movement of the bell-crank lever 81 and consequent vertical movement of the rod 89. Also, when focusing, if it is necessary to move the lens casing vertically, which necessitates moving the slide 14 correspondingly, such movement of said slide and the resulting movement of the lens casing will cause the links 86 and 84 to move upwardly or downwardly upon their respective pivots 80 and 85, keeping the link 66 and arm 82 of the bell-crank lever 81 parallel, and rocking the arm 79 and link 87 upon their pivots 77 and 94 respectively without causing any rocking movement of the bell-crank lever 81 upon its pivot 80 and consequent vertical movement of the rod 89. It is evident, therefore, that the mechanism of this invention permits the iris diaphragm 42 of the camera lens to be controlled automatically from all positions of said lens.

The mechanism of this invention is utilized in the off-set printing art where "high" negatives desired and where it is necessary to increase the diameter of the diaphragm aperture 46 for both middletone and highlight exposures as follows: The lever 68 is grasped and moved toward the right, Fig. 2, thereby moving the indicator 75 toward the left and toward the "high" side of the dial 76. During this movement of the lever 68 the parallel arrangement of the links 66, 84 and 86, and arm 82 of the bell-crank lever 81 will function to rock the arm 79 and link 87 toward the left, Fig. 2, causing the lever 59 to move the pin 56 and arm 55 of the operating lever 52 toward the left thereby actuating the diaphragm 42 to increase the size of its aperture 46. The subsequent movement of the operating lever 52 after the camera has been focused and prior to the making of the exposures in the manner hereinbefore described will cause the diaphragm aperture for both middletone and highlight exposures to be increased.

The mechanism of this invention is utilized in the photo-engraving art where "low" negatives are desired and where it is necessary to decrease the diameter of the diaphragm aperture 46 for both middletone and highlight exposures as follows: The lever 68 is grasped and moved toward the left, Fig. 2, thereby moving the indicator 75 toward the right and toward the "low" side of the dial 76. During this movement of the lever 68 the parallel arrangement of the links 66, 84 and 86, and the arm 82 of the bell-crank lever 81 will function to rock the arm 79 and link 87 toward the right, Fig. 2, causing the lever 59 to move the pin 56 and arm 55 of the operating lever 52 toward the right thereby actuating the diaphragm 42 to decrease the size of its aperture 46. The subsequent movement of the operating lever 52 after the camera has been focused and prior to the making of the exposures will cause the diaphragm aperture for both middletone and highlight exposures to be decreased.

The diaphragm operating lever 52 may be released instantly at all times from the locking lever 59 in order that the diaphragm may be set for an aperture of predetermined size for "flashing" purposes by lifting the free end of the lever 59 and releasing the pin 56 from the notch 64 thereby permitting said pin to slide freely in the slot 63 when the lever 52 is moved in either direction.

I claim:

1. A camera having, in combination, front and rear box members and a bellows therebetween, a lens mounted upon said front box member, a diaphragm for said lens having an aperture therein, means to operate said diaphragm to vary the size of said aperture, a cam provided with oppositely disposed cam surfaces carried by said rear box member and projecting forwardly therefrom, means to position said box members to focus said lens, means carried by said front box member and co-operating with said cam to restrict the movement of said diaphragm operating means in opposite directions, and means to govern the action of said restricting means.

2. A camera having, in combination, front and rear box members and a bellows therebetween, a lens mounted upon said front box member, a diaphragm for said lens having an aperture therein, a lever for operating said diaphragm to vary the size of said aperture, a cam carried by said rear box member and projecting forwardly therefrom and beyond said front box member, means to position the front box member to focus the lens and position the cam, a bell-crank lever mounted upon the front box member, means to operatively connect an arm of said bell-crank lever with said cam, and means carried by the front box member and connected to the other arm of the bell-crank lever and interlocking with said operating lever for the diaphragm to restrict the movements of the latter.

3. A camera having, in combination, front and rear box members and a bellows therebetween, a lens mounted upon said front box member, a diaphragm for said lens having an aperture therein, means for operating said diaphragm to vary the size of said aperture, a cam carried by said rear box member having cam surfaces extending beyond the front box member, means to position the box members relatively to each other to focus the lens and position the cam, a bell-crank lever mounted upon the front box member, a slide operatively connected at one end thereof to an arm of said lever and at its other end positioned adjacent to said cam, means upon said slide to engage said cam surfaces, and means including parallel links operatively connected to the bell-crank lever and interlocking with the operating lever for the diaphragm to restrict the movements of the latter as determined by the position of the cam.

4. A camera having, in combination, front and rear box members and a bellows therebetween, a lens mounted upon said front box member, a diaphragm of said lens having an aperture therein, means for operating said diaphragm to vary the size of said aperture, a cam carried by said rear box member and provided with cam surfaces extending beyond said front box member, means to position the box members to focus the lens and position the cam, a rocker arm mounted upon the front box member, a bell-crank lever pivotally mounted upon the free end of said rocker arm, a slide operatively connected at one end thereof to an arm of said bell-crank lever and at its other end positioned adjacent to said cam, means upon said slide to engage said cam surfaces, means including parallel links operatively connected to the bell-crank lever and interlocking with the operating means for the diaphragm to restrict the movements of the latter as determined by the position of the cam, and means to vary the normal position of said parallel links and rocker arm and thereby govern the action of said restricting means.

5. A camera having, in combination, front and rear box members and a bellows therebetween, a lens mounted upon said front box member, a diaphragm for said lens having an aperture therein, means to operate said diaphragm in opposite directions to vary the size of said aperture, a cam carried by said rear box member and projecting forwardly therefrom and having independent cam surfaces upon upper and lower faces thereof, means to position said box members to focus the lens and position the cam, a bell-crank lever carried by the front box member, means to operatively connect an arm of said bell-crank lever with said cam surfaces, and means operatively connected to the bell-crank lever and interlocking with the operating means for the diaphragm to restrict the movements of the latter as determined by the position of the cam surfaces.

6. A camera having, in combination, front and rear box members and a bellows therebetween, a lens mounted upon said front box member, a diaphragm for said lens having an aperture therein, means to operate said diaphram in opposite directions to vary the size of said aperture, a cam carried by said rear box member and projecting forwardly therefrom and beyond the front box member and having independent cam surfaces upon upper and lower faces thereof, means to position said box members to focus the lens and position the cam, means to move the lens laterally of the front box member, a bell-crank lever carried by the front box member, means to operatively connect an arm of said bell-crank lever with said cam surfaces, and means including parallel links operatively connected to the bell-crank lever and interlocking with the operating means for the diaphragm to restrict the movements of the latter as determined by the position of the cam surfaces.

7. A camera having, in combination, front and rear box members and a bellows therebetween, a lens mounted upon said front box member, a diaphragm for said lens having an aperture therein, means to operate said diaphragm in opposite directions to vary the size of said aperture, a cam carried by said rear box member and having independent cam surfaces upon upper and lower faces thereof, means to position said box members to focus the lens and position the cam, means to move the lens laterally, a rocker arm mounted upon the front box member, a bell-crank lever pivotally mounted upon the free end of said rocker arm, means to operatively connect an arm of said bell-crank lever with said cam surfaces, and means including parallel links operatively connected to the bell-crank lever and interlocking with the operating means for the diaphragm to restrict the movements of the latter in opposite directions as determined by the position of the cam surfaces.

8. A camera having, in combination, front and rear box members and a bellows therebetween, a lens mounted upon said front box member, a diaphragm for said lens having an aperture therein, means to operate said diaphragm to vary the size of said aperture, a cam carried by said rear box member and extending forwardly therefrom and beyond the front box member, said cam having independent cam surfaces upon upper and lower faces thereof, means to position the box members to focus the lens and position the cam, a rocker arm mounted upon the front box member, a bell-crank lever pivotally mounted upon the free end of said rocker arm, means to operatively connect an arm of said bell-crank lever with said cam surfaces, means including parallel links operatively connected to the bell-crank lever and interlocking with the operating means for the diaphragm to restrict the movements of the latter in opposite directions as determined by the position of the cam surfaces, a lever pivotally mounted upon the front box member and operatively connected to said parallel links to vary the normal position of said links and rocker arm, an indicator for said lever, and a dial associated with said indicator.

HARRISON W. BAILEY.